United States Patent
Howard

(10) Patent No.: US 10,762,576 B1
(45) Date of Patent: *Sep. 1, 2020

(54) GAMIFICATION OF RENTER'S/HOMEOWNER'S INSURANCE PRODUCTS

(71) Applicant: United Services Automobile Association ("USAA"), San Antonio, TX (US)

(72) Inventor: Christopher Howard, San Antonio, TX (US)

(73) Assignee: United Services Automobile Association ("USAA"), San Antonio, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 16/284,974

(22) Filed: Feb. 25, 2019

Related U.S. Application Data

(63) Continuation of application No. 15/208,958, filed on Jul. 13, 2016, now Pat. No. 10,262,375.

(60) Provisional application No. 62/191,611, filed on Jul. 13, 2015.

(51) Int. Cl.
| | | |
|---|---|---|
| *G06Q 40/00* | (2012.01) | |
| *G06Q 40/08* | (2012.01) | |
| *A63F 13/33* | (2014.01) | |
| *A63F 13/335* | (2014.01) | |
| *A63F 13/32* | (2014.01) | |
| *A63F 13/61* | (2014.01) | |

(52) U.S. Cl.
CPC ............ *G06Q 40/08* (2013.01); *A63F 13/32* (2014.09); *A63F 13/33* (2014.09); *A63F 13/335* (2014.09); *A63F 13/61* (2014.09)

(58) Field of Classification Search
CPC ........ G06Q 40/00; G06Q 40/08; A61F 13/32; A61F 13/33; A61F 13/335; A61F 13/61
See application file for complete search history.

(56) References Cited

U.S. PATENT DOCUMENTS

| | | |
|---|---|---|
| 8,630,961 B2 | 1/2014 | Beilby et al. |
| 8,965,803 B2 | 2/2015 | Jung et al. |
| 9,710,821 B2 | 7/2017 | Heath |
| 2010/0169125 A1 | 7/2010 | Dawson et al. |
| 2012/0143536 A1 | 6/2012 | Greaves et al. |
| 2014/0006129 A1 | 1/2014 | Heath |
| 2014/0195272 A1 | 7/2014 | Sadiq et al. |
| 2017/0201779 A1 | 7/2017 | Publicover et al. |

OTHER PUBLICATIONS

Resources for Web Buying, Savetz, Kevin; Gardiner, Peace. Computer Shopper: 203. SX2 Media Labs LLC. (Mar. 2000).

*Primary Examiner* — Lalita M Hamilton
(74) *Attorney, Agent, or Firm* — Locke Lord LLP; Christopher J. Capelli

(57) ABSTRACT

Techniques for providing information related to insurance services solicit interaction from a user (e.g., during video game play). The solicited interaction identifies a real property. A virtual environment gaming landscape is generated. The gaming landscape includes a virtual representation of the identified real property. Additional interaction from the user with the virtual environment gaming landscape is solicited. A risk assessment related to the identified real property is performed based on user's interaction with the virtual environment gaming landscape. A recommendation regarding one or more services is provided based on the performed risk assessment.

13 Claims, 3 Drawing Sheets

GAMIFICATION OF RENTER'S/HOMEOWNER'S INSURANCE PRODUCTS

CROSS REFERENCE TO RELATED APPLICATIONS

This application is a Continuation of U.S. patent application Ser. No. 15/208,958, filed Jul. 13, 2016, which is incorporated herein by reference in its entirety.

BACKGROUND

1. Field of the Invention

The present disclosure relates to risk management services, and more particularly, to gamifying such services.

2. Description of the Related Art

Today, various types of risk management services, such as insurance providers, use a variety of platforms to reach an ever-increasing customer base. In particular, insurance providers leverage the power and reach of networks such as the Internet, and provide an environment to advertise, solicit, send information regarding various services, and otherwise provide access to manage insurance services for respective policy holders.

However, in leveraging the power and reach of networks, the environments created are often poorly designed, overly complex, and generally cumbersome to a user. For example, in certain instances, the environments are modeled to mimic traditional in-person brick and mortar experiences, leading to sub-optimal experiences. Moreover, the next generation (and even some of the current generation) of prospective policy holders typically use the Internet in a significantly different manner (e.g., to communicate using social media, for entertainment such as applications, video games, etc., and the like) than traditional in-person communication (e.g., conventional brick and mortar establishments). Accordingly, such environments often fail to relate to or otherwise engage various policy holders.

Although attempts have been made to date to attract potential policy holders, a need still remains for techniques that dynamically engage both existing policy holders and prospective policy holders, and also educate young, inexperienced prospective policy holders who have limited insight or interest in relevant insurance products.

SUMMARY

The present disclosure provides dynamically engaging environments and relatable interfaces and visualizations to solicit interaction from users such as prospective and existing policy holders. Such techniques are particularly adapted to gamify insurance based services for video gameplay.

According to one embodiment of the subject disclosure, a risk management or insurance provider server solicits interaction from a user. Interaction identifying a real property can be solicited, for example, during game play of a video game by user prompts, popup windows, secret interactive elements in a video game, and the like. Further, the insurance provider generates a virtual environment gaming landscape which constitutes a virtual representation of the identified real property. The interaction with the virtual environment gaming landscape preferably solicits additional information from the user regarding the identified real property. Based on user's interaction with the virtual environment gaming landscape in conjunction with additional public and industry data sources (e.g. actuarial estimates of catastrophe risk given a particular geography), a risk assessment related to the identified real property is performed. Further, based on the performed risk assessment, the insurance provider offers a recommendation regarding one or more insurance-related services.

These and other features of the systems and methods of the subject invention will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein.

A component or a feature that is common to more than one drawing is indicated with the same reference number in each of the drawings.

DESCRIPTION OF EXAMPLE EMBODIMENTS

Figure 1:
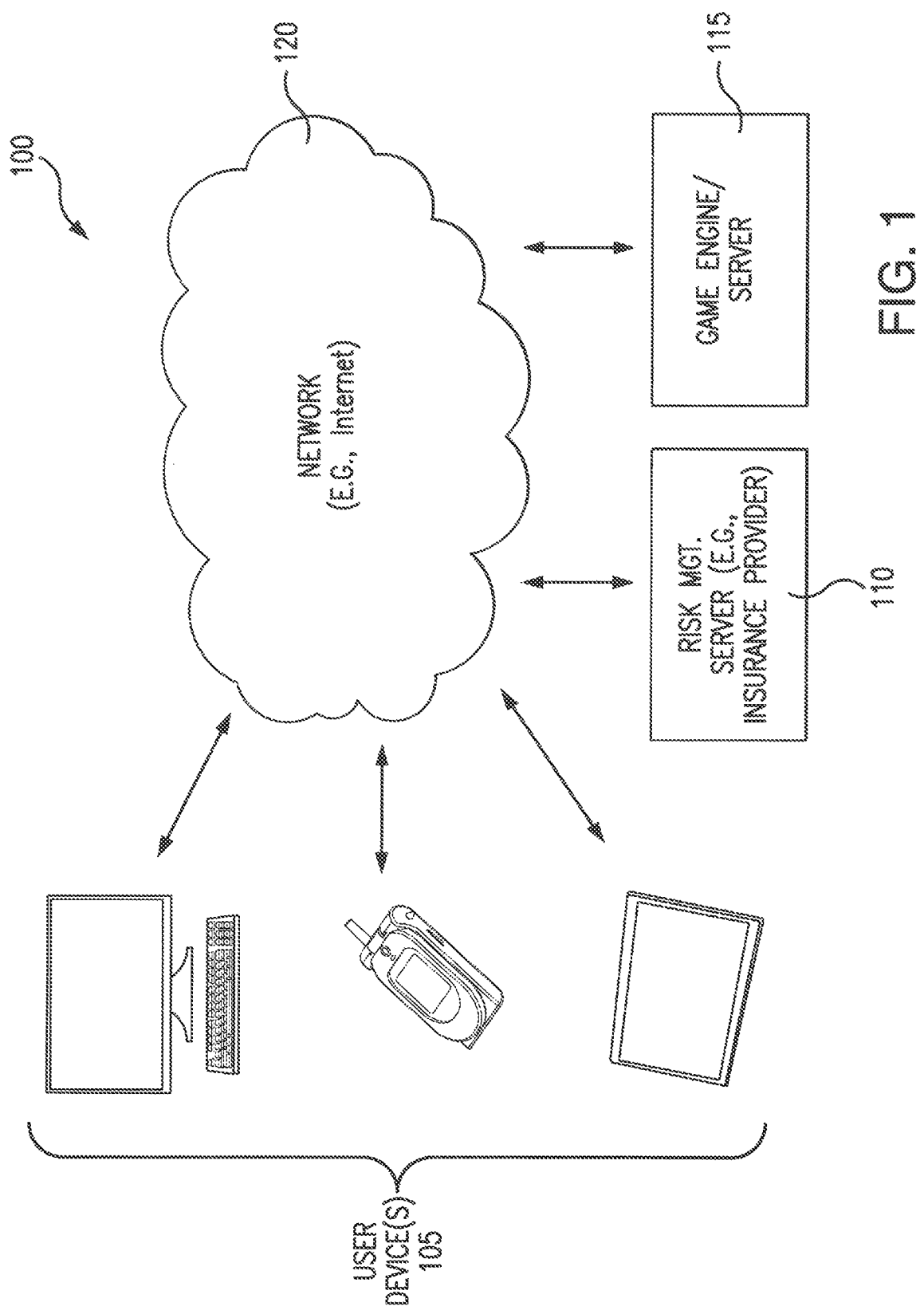
FIG. 1 illustrates a schematic block diagram of an example risk management environment.

As used herein, the term risk management or risk management service includes insurance services and refers to contracts between an insurer, also known as a risk management and insurance company, and an insured, also known as a policyholder, in which the insurer agrees to indemnify the insured for specified losses, costs, or damage on specified terms and conditions in exchange of a certain premium amount paid by the insured. In a typical situation, when the insured suffers some loss for which he/she may have insurance, the insured makes an insurance claim to request payment for the loss. It is to be appreciated for the purpose of the embodiments illustrated herein, the insurance policy is not to be understood to be limited to a residential or homeowners insurance policy, but can be for a commercial, umbrella, and other insurance policies known by those skilled in the art.

As used herein, the term "insurance policy" or "insurance" may encompass a warranty or other contract for the repair, service, or maintenance of insured property.

As used herein, "real property" means a dwelling, other buildings or structures, personal property, or business property, as well as the premises on which these are located, some or all which may be covered by an insurance policy.

As discussed above, the subject disclosure leverages the addictive and competitive nature of video games with a new and/or an existing customer base for risk management service policy holders. In particular, the techniques disclosed herein gamify learning, securing, and/or managing risk management services such as insurance services (e.g., an insurance service, home owners insurance, rental insurance, property insurance, umbrella insurance, etc.). There are a number of computer-based environments that are continuous in nature in that the status of the environment in relation to a particular user continues to change, even when the user is not actively participating in the environment. Some of these computer-based environments are purely virtual in nature such that the environment is entirely based on computer-generated inputs. For example, SimCity™ is a city-building virtual environment in which the size and condition of a virtual city that a player builds continues to change while the player is involved in other activities. In addition, Second Life™ is a virtual world which allows users to interact with each other through avatars. In particular, a user's avatar may explore, meet other avatars, create and trade virtual property and services from one another, and participate in individual and group activities.

In addition to the purely virtual environments, some virtual environments combine computer-generated inputs with real world events. In particular, fantasy sports, such as Fantasy Football, allow a participant to draft, acquire, and trade a team of real-life players, such as National Football League™ players, and to score points based on those players' statistical performances on the actual field. Such blended real environments and virtual environments expand the realm of the virtual environment and can include features such as providing a competitive advantage (e.g., a new power, a new level, a new weapon, and the like) to users when, for example, they provide information regarding their property, complete educational modules, secure new policies, update or renew existing policies, and the like. In this fashion, the subject disclosure also leverages social aspects of a gaming community to be directed toward the right services (i.e., insurance coverages) to mitigate a given user's risk by engaging with service providers.

For purposes of discussion herein, the risk management services are discussed with respect to renter's/homeowner's insurance services and with respect to providing certain recommendations, as discussed below. However, the embodiments in their broader sense are not limited to any specific renter's/homeowner's insurance service or any particular recommendation, but can be employed using a variety of services and recommendations that engage with existing or perspective customer bases.

Referring now to FIG. 1, a schematic block diagram of an example risk management environment 100 is shown. Risk management 100 includes user devices 105, a risk management server 110 (e.g., from an insurance provider), and a game engine/server 115. Each of the user devices 105, the risk management server 110, and the game engine/sever 115 communicate data or information by a network 120 (e.g., the Internet).

As shown, user devices 105 include, for example, a computer, a laptop, a mobile device, and a tablet. User devices 105 are appreciated to include any number of devices that can access a virtual environment (e.g., hosted by game engine/server 115).

Risk management server 110 includes any processing hardware/software of a risk management provider or underwriter. For example, risk management server 110 can include various processors, memory, databases, and the like, and supports interaction between risk management providers such as insurance providers and users such as policy holders and potential policy holders (e.g., user devices 105 that access a virtual environment by game engine/server 115).

Game engine/server 115 is illustrated as a device configured to provide a player in a real environment with an interface to a corresponding virtual environment as part of an interactive virtual game. In some embodiments, game engine/server 115 may comprise a third party game provider that hosts video game content and provides access to video games to user devices 105. Such game engine/server 115 supports streaming services that continuously exchange data with user devices 105 using network 120 as well as limited exchange to, for example, download video game content locally to user devices 105 from game engine/server 115.

While each of the user devices, risk management server, and game engine/server are shown as standalone and independent devices, it is appreciated that the functionality and techniques described herein can be included or excluded on any device as appropriate (e.g., the risk management server can incorporate a game engine/server, etc.). Further, it is appreciated that any of these devices can be part of a larger distributed processing system and that the views shown in risk management environment 100 are for purposes of discussion and not limitation.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
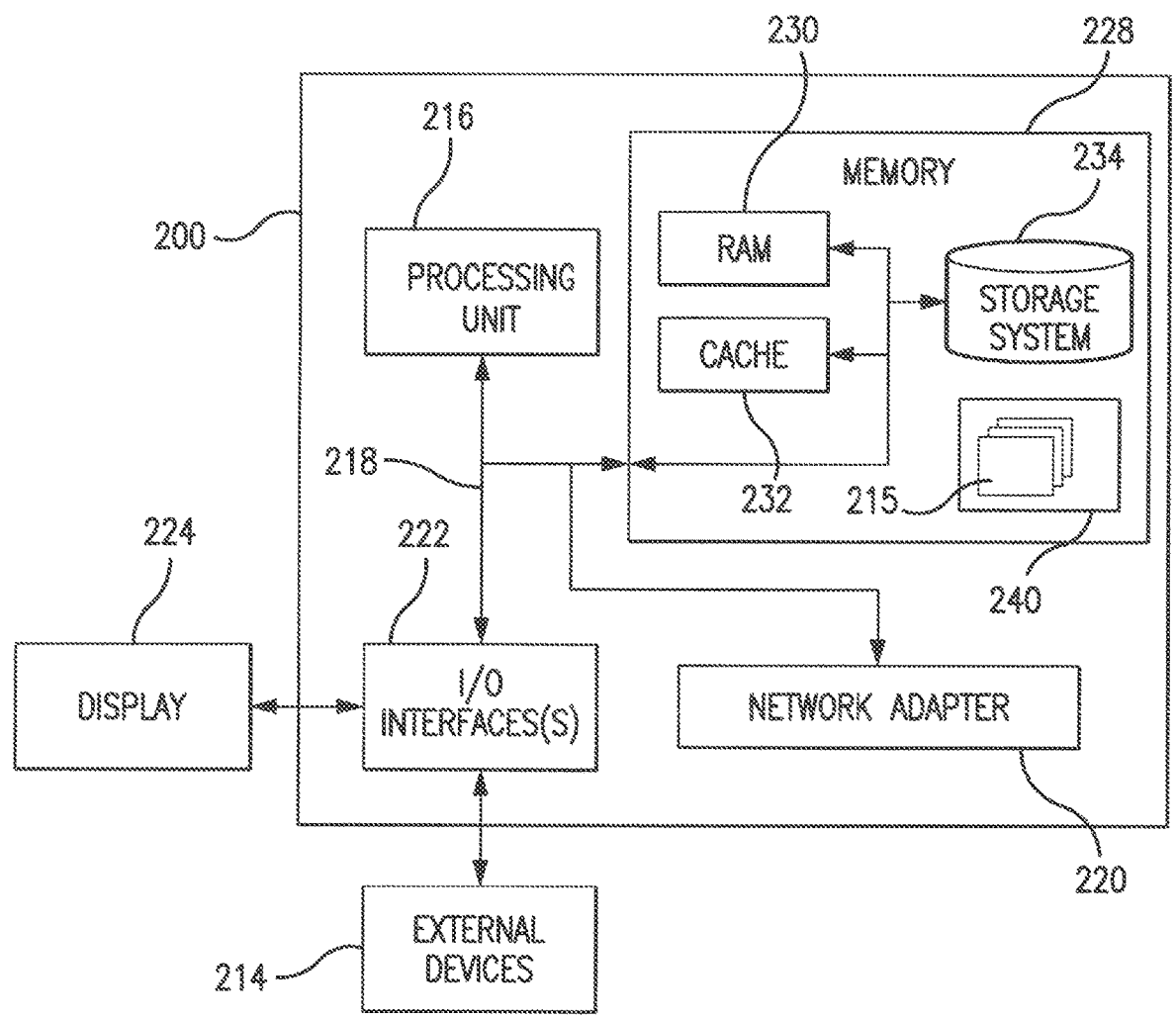
FIG. 2 illustrates an example risk management network device/server/node.

FIG. 2 is a schematic block diagram of an example network computing device 200 (e.g., user devices 105, risk management server 110 and/or game engine/server 115) that may be used (or components thereof) with one or more embodiments described herein, e.g., as one of the nodes shown in the network 120. As explained above, in different embodiments these various devices are configured to communicate with each other in any suitable way, such as, for example, via communication network 120.

Device 200 is intended to represent any type of computer system capable of supporting gamifying techniques disclosed herein and capable of carrying out other teachings of various embodiments of the present invention. Device 200 is only one example of a suitable system and is not intended to suggest any limitation as to the scope of use or functionality of embodiments of the invention described herein. Regardless, computing device 200 is capable of being implemented and/or performing any of the functionality set forth herein.

Computing device 200 is operational with numerous other general purpose or special purpose computing system environments or configurations. Examples of well-known computing systems, environments, and/or configurations that may be suitable for use with computing device 200 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, and distributed data processing environments that include any of the above systems or devices, and the like.

Computing device 200 may be described in the general context of computer system-executable instructions, such as program modules, being executed by a computer system. Generally, program modules may include routines, programs, objects, components, logic, data structures, and so on that perform particular tasks or implement particular abstract data types. Computing device 200 may be practiced in distributed data processing environments where tasks are performed by remote processing devices that are linked through a communications network. In a distributed data processing environment, program modules may be located in both local and remote computer system storage media including memory storage devices.

Device 200 is shown in FIG. 2 in the form of a general-purpose computing device. The components of device 200 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing device 200 typically includes a variety of computer system readable media. Such media may be any available media that is accessible by device 200, and it includes both volatile and non-volatile media, removable and non-removable media.

System memory 228 can include computer system readable media in the form of volatile memory, such as random access memory (RAM) 230 and/or cache memory 232. Computing device 200 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 215, such as gaming framework, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 215 generally carry out the functions and/or methodologies of embodiments of the invention as described herein.

Device 200 may also communicate with one or more external devices 214 such as a keyboard, a pointing device, a display 224, etc.; one or more devices that enable a user to interact with computing device 200; and/or any devices (e.g., network card, modem, etc.) that enable computing device 200 to communicate with one or more other computing devices. Such communication can occur via Input/Output (I/O) interfaces 222. Still yet, device 200 can communicate with one or more networks such as a local area network (LAN), a general wide area network (WAN), and/or a public network (e.g., the Internet) via network adapter 220. As depicted, network adapter 220 communicates with the other components of computing device 200 via bus 218. It should be understood that although not shown, other hardware and/or software components could be used in conjunction with device 200. Examples, include, but are not limited to: microcode, device drivers, redundant processing units, external disk drive arrays, RAID systems, tape drives, and data archival storage systems, etc.

FIGS. 1 and 2 are intended to provide a brief, general description of an illustrative and/or suitable exemplary environment in which embodiments of the below described present invention may be implemented. FIGS. 1 and 2 are exemplary of a suitable environment and are not intended to suggest any limitation as to the structure, scope of use, or functionality of an embodiment of the present invention. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

Figure 3:
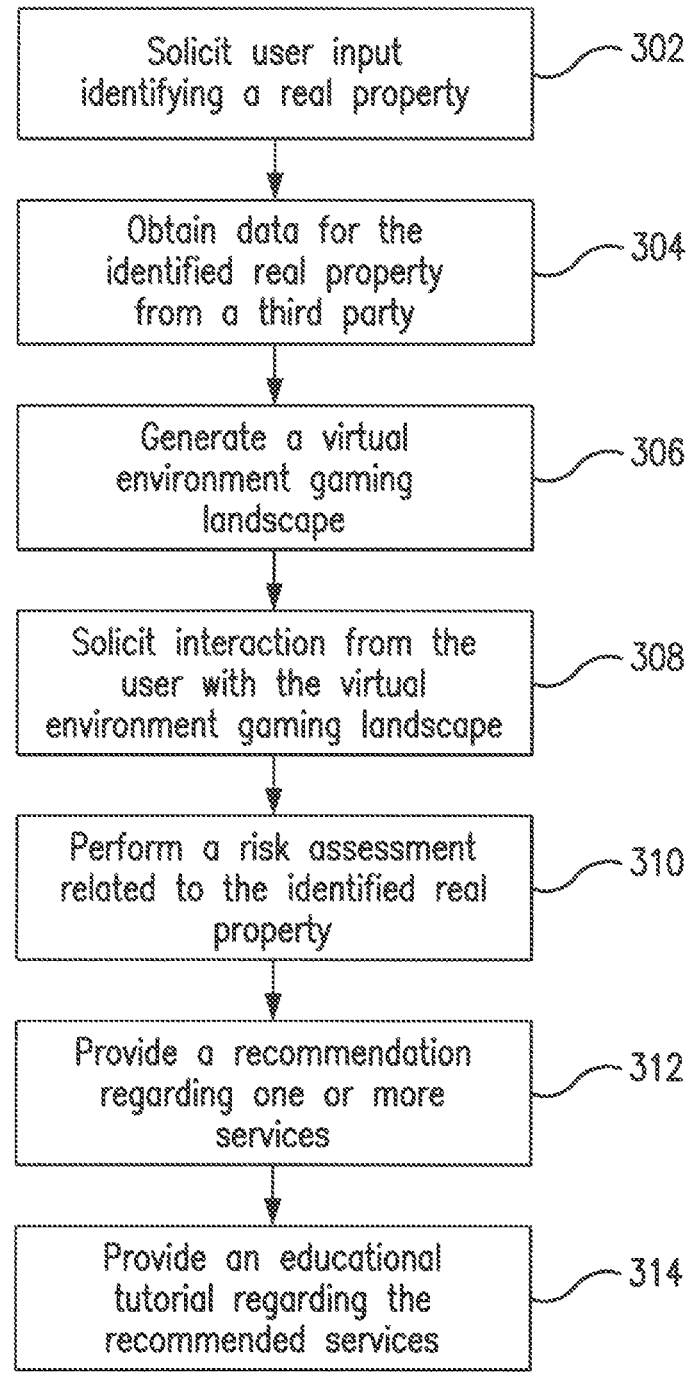
FIG. 3 is a flowchart depicting an illustrated method of operation of the illustrated embodiments.

With the exemplary communication network 100 (FIG. 1) and computing device 200 (FIG. 2) being generally shown and discussed above, description of certain illustrated embodiments of the present invention will now be provided. With reference now to FIG. 3, shown is a flowchart demonstrating implementation of the various exemplary embodiments regarding facilitating gamification of renter's/homeowner's insurance products in accordance with one or more embodiments of the invention. While an explanation is given in reference to the renter's/homeowner's insurance products, various embodiments of the present invention may be adopted for other insurance products, such as, but not limited to, auto insurance products, valuable personal property insurance products, and the like. It is noted that the order of operations shown in FIG. 3 is not required, so in principle, the various operations may be performed out of the illustrated order. In one or more embodiments of the invention, one or more steps shown in FIG. 3 may be omitted, repeated, and/or performed in a different order than the order shown in FIG. 3. Accordingly, embodiments of the invention should not be considered limited to the specific arrangement of steps shown in FIG. 3.

FIG. 3 illustrates an example simplified procedure for gamifying risk management services such as homeowner's and renter's insurance based services. The illustrated exemplary steps are shown from the perspective of risk management server 110 (e.g., from an insurance provider) and in accordance with gaming framework.

At step 302 the risk management server 110 solicits interaction from a user. Interaction can be solicited, for example, during game play of a video game by user prompts, popup windows, secret interactive elements in a video game, and the like. Such interaction preferably solicits information from the user regarding one or more real properties either owned or occupied by the user. User input identifying the real property can include, without limitation, an address of the real property, geo-spatial floor layout data of the real property (e.g., the floor area, the number of floors/bedrooms/bathrooms), information indicating whether the real property has a view, the year in which the real property was constructed, etc. For example, user input may indicate that he/she lives at 222 Main St., Middletown, Conn., 06051 having a floor area of 2300 square feet, 5 bedrooms, 3 bathrooms, 3 floors, no view, built in 1985. Those skilled in the art will appreciate that the risk management server 110 can use a different and/or a larger number of attributes identifying a real property. In some embodiments of the present invention, a mobile computing device 105 can include a GPS receiver or other types of location detectors. Thus, in some embodiments, user devices 105 can dynamically provide GPS coordinates for the property of interest to the risk management server 110.

The risk management server 110, according to one embodiment of the present invention, may optionally accumulate data for the identified real property from a wide variety of sources (step 304). The most common (and usually most extensive) source is the county clerk's (or county recorder's) complete set of real estate records. Data is also preferably accumulated by the risk management server 110 from sources other than the county clerk, e.g., bankruptcy courts and various local governmental agencies which may record instruments that are unique to a particular jurisdiction (e.g., Environmental Control Board judgments in New York City). All of the mentioned data may be acquired in any number of ways, including FTP or XML over the Internet 120. The data may be collected at step 304 directly from the official source or via a third party service. Data that may be collected includes various attributes of the real property of interest directed to, for example, construction materials, structure type, parking structure, heating technology, roofing materials, dwelling design type, view quality, number of rooms, school district, neighborhood or subdivision, attic and other storage, etc.

The game engine 115 generates, in step 306, a virtual environment based at least on data obtained in steps 302 and/or 304. For example, the game engine 115 may generate a virtual representation of geo-spatial floor layout corresponding to the identified real property, where features/attributes of the real property are mapped to a virtual environment. In this step, the game engine 115 may also create virtual characters (avatars) and/or map a user to a virtual character. The game engine 115 then combines the virtual environment and characters (e.g., members of user's household) into an interactive game (gaming landscape). For instance, in the interactive game, users (players) may compete (alone or in teams) to achieve a goal or beat another player or group of players. An output module (e.g., display screen on a mobile device 105) may display the virtual environment, virtual characters, and other gaming information to the user.

In some embodiments, the generated virtual environment gaming landscape can include a function where a user can view images of augmented reality of how the user's property would appear after adding/removing certain objects, after changing floor layouts, after demonstrating the impact of natural disasters, etc. As a non-limiting example, the interactive game rendered by the game engine 115 may remove objects that act as fire fuel from the virtual map of the identified real property. Such augmented images can provide the user with information related to safeguarding the user's property against wildfires or other natural hazards.

According to an embodiment of the present invention, the virtual objects generated by the game engine 115 for the virtual environment may include a number of virtual objects representing personal property items that are in the player's possession. A player can possess a potentially large number of virtual items that correspond with physical items legally owned in the real world. These virtual items can include such varied components as pieces of furniture, household appliances, valuables, books, clothing, etc. It is noted that various virtual objects may be displayed within the generated virtual environment gaming landscape in an arrangement as selected by the human player. Non-limiting examples of arrangements include furniture arranged in a room, or plants, decking, and pavers arranged in a yard.

According to one or more embodiments of the present invention, in step 308, the game engine 115 further solicits interaction from the user with various virtual objects and/or avatars to obtain additional information about the property of interest. In one embodiment, the gaming landscape may comprise a "Price My Home" interactive game which could be designed to help players determine contents' values of one or more residential properties and to help determine corresponding insurance policy needs. The gaming landscape methodology can be used to determine values of different characteristics of a home that are used to estimate its value. Two types of characteristics can include, for example, home renovations and contents. Home renovations can include the additions and alterations to the virtual environment representing user's home. Home contents can include home furnishings and the avatars' wardrobes. Advantageously, the interactive gaming landscape generated by the game engine 115 helps users to research different types of home renovations (e.g., additions and alterations, etc.) and home contents (e.g., wardrobe, furnishings, etc.) based on their quantity and quality and helps determine corresponding insurance needs. In another embodiment, the gaming landscape may comprise a "Safeguard My Future" interactive game which could be designed to educate players on different types of protections provided by different types of insurance policies. For example, this gaming methodology may explain to users, preferably in interactive manner, that renter's insurance covers personal possessions but Valuable Personal Property (VPP) policy may be needed to protect user's jewelry and IT assets. Further, this gaming methodology may explain to users the limitations of certain policies with regards to different types of catastrophes (e.g. catastrophic flooding may not be covered under homeowner's insurance without an additional flood policy or rider).

Next, in step 310, the risk management server 110 performs a comprehensive risk assessment related to the identified real property based on information obtained by the game engine 115. For example, in this step, the risk management server 110 accesses the values for home renovations and contents based on the data entered by the user into the virtual environment gaming landscape to calculate an estimate of the value (e.g., total replacement cost value) of a user's home or other type of real property. As another non-limiting example, the risk management server 110 may analyze behavior of the user's avatar (i.e., avatar's participation in individual and/or group activities) to generate user's risk profile. In addition, this step may involve identifying latent dangers around the real property, such as fires, floods and other natural hazards. Further, data collected by the game engine 115 can be analyzed by the risk management server 110 to determine mitigatable items around the identified real property that can be removed or modified to reduce the risk of natural hazards associated with the real property. According to embodiments of the present invention, the interactive game rendered by the game engine 115 can provide a user (property owner/renter) with an opportunity to minimize potential damages by addressing identified mitigatable items prior to a natural hazard or any other type of foreseeable risk.

Based on the risk assessment analysis, in step 312, the risk management server 110 provides a recommendation regarding one or more insurance related services. For example, the risk management server 110 may provide recommendations on the types of policies and/or amounts of coverage needed to mitigate the majority of foreseeable risks. As another non-limiting example, if in step 310, the risk management server 110 analyzes a list of household appliances represented by a plurality of virtual objects within the virtual reality gaming landscape, then, in step 312, the risk management server 110 may provide one or more recommendations related to energy efficiency and conservation. According to an embodiment of the present invention, the risk management server 110 may provide the generated recommendations to the game engine 115. At least in some embodiments, the game engine 115 may leverage gamification techniques to provide such recommendations, for example, during game play by user prompts, popup windows, secret interactive elements in a video game, and the like.

Optionally, in step 314, one or more educational tutorials and/or one or more solicitations to secure additional or improved services are provided by the game engine 115 to the user regarding the recommended services. As the user completes the educational tutorial and/or the solicitation, the game engine 115 determines a completion progress. Notably, the completion progress can be determined, for example, by user navigation that advances to various portions of the educational tutorial, receipt or completion of required information, and securing additional services. Tutorials are designed to teach one or more concepts in relevant insurance products, such as renter's or homeowner's insurance, directed toward the right coverages to mitigate a given user's risk. Furthermore, completion of these tutorials may warrant the award of incentives (real or virtual) to propagate and catalyze preferred behaviors.

It should be noted that the steps shown in FIG. 3 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide interactive, dynamic and engaging techniques to provide and gamify risk management and insurance services to users. The techniques described above are customizable for each individual user to drive engagement and create added business value to various insurance services providers.

While there have been shown and described illustrative embodiments that gamify risk management services, it is to be understood that various other adaptations and modifications may be made within the spirit and scope of the embodiments herein. For example, the embodiments have been shown and described herein with relation to particular display elements; however, the embodiments in their broader sense are not limited to such display elements but can encompass a variety of display elements.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method for providing information related to insurance services, the method comprising:
   receiving user input identifying a real property;
   generating, by a processor, a virtual environment gaming landscape on a display comprising a virtual representation of a geo-spatial floor layout corresponding to the identified real property;
   soliciting, by the processor, interaction on the display from the user with the virtual environment gaming landscape;
   performing, by the processor, a risk assessment related to the identified real property based on user's interaction with the virtual environment gaming landscape; and
   creating, by the processor, at least one avatar wherein the user is represented by the at least one avatar in the virtual environment gaming landscape.

2. The method of claim 1, wherein the step of generating a virtual environment gaming landscape further comprises obtaining, by the processor, data for the identified real property from a third party.

3. The method of claim 1, wherein the method further includes providing, by the processor, a recommendation regarding one or more services based on the performed risk assessment of the virtual environment gaming landscape.

4. The method of claim 1, wherein the virtual environment gaming landscape enables the user to modify the virtual representation of geo-spatial floor layout corresponding to the identified real property.

5. The method of claim 1, wherein the plurality of objects represent a plurality of personal property objects associated with the identified real property.

6. The method of claim 1, wherein the one or more services includes at least one of homeowner's insurance services, renter's insurance services, personal automobile insurance services, umbrella liability insurance services, valuable personal property insurance services, boat insurance services and snowmobile insurance services.

7. The method of claim 6, further comprising providing, by the processor, an educational tutorial to the user regarding the one or more recommended services within the virtual environment gaming landscape.

8. The method of claim 5, wherein the plurality of personal property objects comprise a plurality of household appliances and wherein the provided recommendation is related to energy efficiency and conservation.

9. A computer system for providing information related to insurance services, comprising:
   a memory configured to store instructions;
   a processor disposed in communication with the memory, wherein the processor upon execution of the instructions is configured to:
   receive user input identifying a real property;
   generate a virtual environment gaming landscape on a display comprising a virtual representation of a geo-spatial floor layout corresponding to the identified real property;
   solicit interaction from the user on the display with the virtual environment gaming landscape;
   perform a risk assessment related to the identified real property based on user's interaction with the virtual environment gaming landscape; and
   create at least one avatar wherein the user is represented by the at least one avatar in the virtual environment gaming landscape.

10. The computer system as recited in claim 9, wherein performing a risk assessment includes analysis of the user input to determine mitigatable items situated in the vicinity of the identified real property such that the mitigatable items can be removed or modified to reduce a risk of natural hazards associated with the identified real property.

11. The computer system as recited in claim 9, wherein the processor is further configured to recommend one or more services based on the performed risk assessment.

12. The computer system as recited in claim 9, wherein the processor is further configured to provide an educational tutorial to the user regarding the one or more recommended services within the virtual environment gaming landscape and configured to determine user's completion progress with respect to the provided educational tutorial.

13. The computer system as recited in claim 10, wherein performing a risk assessment further includes analysis of the user input to determine monetary values of a plurality of characteristics associated with the identified real property and wherein the plurality of characteristics are indicative of the identified real property's overall monetary value.

* * * * *